(12) United States Patent
Asano et al.

(10) Patent No.: US 6,931,640 B2
(45) Date of Patent: Aug. 16, 2005

(54) COMPUTER SYSTEM AND A METHOD FOR CONTROLLING A COMPUTER SYSTEM

(75) Inventors: Masayasu Asano, Yokohama (JP); Toshiaki Arai, Machida (JP); Hirofumi Yamashita, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 741 days.

(21) Appl. No.: 09/756,282

(22) Filed: Jan. 9, 2001

(65) Prior Publication Data
US 2001/0044817 A1 Nov. 22, 2001

(30) Foreign Application Priority Data
May 18, 2000 (JP) ........................................ 2000-146867

(51) Int. Cl.[7] .................................................. G06F 9/46
(52) U.S. Cl. ........................ 718/104; 718/100; 711/153
(58) Field of Search ................................. 718/104, 100, 718/102; 709/319; 710/1; 386/46, 109, 125

(56) References Cited

U.S. PATENT DOCUMENTS

| | | | | |
|---|---|---|---|---|
| 5,043,878 A | * | 8/1991 | Ooi | ............................. 712/42 |
| 5,168,547 A | * | 12/1992 | Miller et al. | ................... 710/1 |
| 5,414,851 A | * | 5/1995 | Brice et al. | .................. 718/104 |
| 6,044,367 A | * | 3/2000 | Wolff | ............................. 707/2 |
| 6,260,068 B1 | * | 7/2001 | Zalewski et al. | ........... 709/226 |
| 6,332,180 B1 | * | 12/2001 | Kauffman et al. | .......... 711/153 |
| 6,381,682 B2 | * | 4/2002 | Noel et al. | .................. 711/153 |
| 6,633,916 B2 | * | 10/2003 | Kauffman | .................... 709/229 |
| 6,647,508 B2 | * | 11/2003 | Zalewski et al. | .............. 714/3 |
| 6,704,489 B1 | * | 3/2004 | Kurauchi et al. | ............. 386/46 |

FOREIGN PATENT DOCUMENTS

JP          11-353292          12/1999

* cited by examiner

*Primary Examiner*—Majid Banankhah
(74) *Attorney, Agent, or Firm*—Mattingly, Stanger, Malur & Brundidge, P.C.

(57) ABSTRACT

In a cluster system including a plurality of operating systems operating on one computer, computer resources can be updated for and reallocated to each operating system. When the operating systems are used as active or standby operating systems, a multiple operating system management controller monitors the state of each operating system. At a failure of an active operating system, the controller allocates a larger part of computer resources to another operating system in a normal state and assigns the operating system as a new active operating system. Regardless of the failure, the computer system can be operated without changing processing capability thereof. The controller can monitor load of each operating system to allocate computer resources to the operating system according to the load.

10 Claims, 15 Drawing Sheets

FIG.3

300 COMPUTER STATE TABLE

310 COMPUTER RESOURCE ALLOCATION TABLE

| 311 COMPUTER RESOURCE NAME | 312 ACTIVE COMPUTER RESOURCE SERVICE RATIO | 313 STANDBY COMPUTER RESOURCE SERVICE RATIO |
|---|---|---|
| CPU | 95% | 5% |
| MAIN MEMORY | | |

320 OS STATE TABLE

| 321 OS NAME | 322 STATE | 323 ACTIVE,STANDBY | 324 CPU |
|---|---|---|---|
| OS 1 | OPERATING | ACTIVE | 95% |
| OS 2 | OPERATING | STANDBY | 5% |

FIG.5

500 COMPUTER RESOURCE CONFIGURATION AREA

510 CPU USE TABLE

| ITEM (511) | VALUE (512) |
|---|---|
| No. OF CPUS IN USE | |
| No. OF CPUS NOT IN USE | |

520 MAIN MEMORY USE TABLE

| ITEM (521) | VALUE (522) |
|---|---|
| No. OF MEMORIES IN USE | |
| No. OF MEMORIES NOT IN USE | |

530 EXTERNAL DEVICE USE TABLE

| ITEM (531) | IN USE/ NOT IN USE (532) |
|---|---|
| I/O 1 | I/O 1 |
| I/O 2 | I/O 2 |
| | |
| I/O n | I/O n |

540 PHYSICAL CPU CONFIGURATION TABLE

| ID (541) | PRIORITY (542) | INITIAL NUMBER (543) | CURRENT NUMBER (544) |
|---|---|---|---|
| 1 | 1 | 2 | 2 |
| 2 | 2 | 1 | 1 |
| | | | |

550 OS CONFIGURATION TABLE

| OS NAME (551) | PRIORITY (552) | TYPE (553) | ID (554) | CPU (555) | MAIN MEMORY (556) | I/O 1 (557) | I/O 2 (558) |
|---|---|---|---|---|---|---|---|
| OS 1 | | | | | | | |
| OS 2 | | | | | | | |
| | | | | | | | |
| OS n | | | | | | | |

FIG.6

COMPUTER RESOURCE UPDATE TABLE 600

| OS NAME 601 | ID 602 | WAIT FLAG 603 | COMPUTER RESOURCE UPDATE CONDITION 604 | | | COMPUTER RESOURCE UPDATE CONFIGURATION 605 | | |
|---|---|---|---|---|---|---|---|---|
| | | | CPU 606 | MAIN MEMORY 607 | I/O 608 | CPU 609 | MAIN MEMORY 610 | I/O 611 |
| OS1 | | | | | | | | |
| OS2 | | | | | | | | |
| Osn | | | | | | | | |
| ALL OS | | | | | | | | |

FIG.7

COMPUTER RESOURCE UPDATE STATE TABLE 700

| OS NAME 701 | CPU 702 | CPU LOAD 703 | MAIN MEMORY 704 | MAIN MEMORY LOAD 705 | I/O 706 | I/O LOAD 707 | I/O 2 708 | I/O 2 LOAD 709 |
|---|---|---|---|---|---|---|---|---|
| OS1 | | | | | | | | |
| OS2 | | | | | | | | |
| Osn | | | | | | | | |

FIG.9

COMPUTER RESOURCE UPDATE TABLE 2
900

| JOB NAME 901 | OS NAME 902 | JOB START TIME 903 | JOB END TIME 904 | WAIT FLAG 905 | COMPUTER RESOURCE REQUEST VALUE 906 | | |
|---|---|---|---|---|---|---|---|
| | | | | | CPU 907 | MAIN MEMORY 908 | I/O 09 |
| 1 | | | | | | | |
| 2 | | | | | | | |
| n | | | | | | | |

FIG.11

1100 USER CONFIGURATION TABLE

1110 USER ACCOUNT TABLE

| USER ID | TIME CHARGED (1111) | 1 CPU (1112) | 2 CPU (1113) | 100M MAIN MEMORY (1114) | 200M MAIN MEMORY (1115) | I/O 1 (1116) | I/O 2 (1117) | CHARGE (1118) |
|---|---|---|---|---|---|---|---|---|
| 1 | | ○ | | | | ○ | | |
| 2 | | ○ | ○ | ○ | | ○ | ○ | |
| n | | | | | | | | |

1120 USER REGISTER TABLE

| USER ID | START TIME (1121) | END TIME (1122) | CPU (1123) | MAIN MEMORY (1124) | I/O (1125) | STANDARD CHARGE (1126) |
|---|---|---|---|---|---|---|
| 1 | ○ | ○ | 1 | 100 | ○ | |
| 2 | 8 | 20 | 2 | 200 | ○ | |
| n | | | | | | |

FIG.12

1200 COMPUTER RESOURCE ACCOUNT STANDARD AREA

1210 CPU ACCOUNT STANDARD TABLE

| 1220 | 1221 | 1222 | 122n |
|---|---|---|---|
| TIME | 1 CPU | 2 CPU | N CPU |
| 1 | | | |
| 2 | | | |
| | | | |

1230 MAIN MEMORY ACCOUNT STANDARD TABLE

| 1240 | 1241 | 1242 | 124n |
|---|---|---|---|
| TIME | 100MB | 200MB | N MB |
| 1 | | | |
| 2 | | | |
| | | | |

1250 EXTERNAL DEVICE ACCOUNT STANDARD TABLE

| 1260 | 1261 | 1262 | 126n |
|---|---|---|---|
| TIME | 1G | 2G | NG |
| 1 | | | |
| 2 | | | |
| | | | |

COMPUTER SYSTEM AND A METHOD FOR CONTROLLING A COMPUTER SYSTEM

BACKGROUND OF THE INVENTION

The present invention relates to a computer system and a method for controlling a computer system in which a plurality of operating systems (OS) operate on one computer, and in particular, to a computer system and a method for controlling a computer system in which computer resources can be efficiently used or operated in an operating state of a plurality of operating systems.

To improve reliability of computers, the JP-A-11-353292 describes a control technique of load distribution of the background art. The technique is called "cluster system" in which when an operating system running on a computer fails, another operating system receives processing of the failed operating system to continue the processing. In the system of the background art, at a failure of an operating system on a computer, programs running on the computer can be continuously executed.

To operate a plurality of operating systems in the cluster system which is a computer system of the background art, an equal number of computers and operating systems are required. The cluster system of the background art includes active computers and standby computers, and the active and standby computers operate independent of each other. In this connection, an active computer is a computer ordinarily operating, and a standby computer is a computer arranged to take over, when the active computer fails, processing of the failed computer to thereby continue the processing.

Therefore, in the cluster system of the background art, when a failure occurs on an active computer, processing thereof is passed to a standby computer. However, when a process is running on the standby computer, entire processing capability of the active computer cannot be achieved by the standby computer. In the background art system, while the standby system is kept stopped to take over the processing of the active computer, the computer resource of the standby computer cannot be efficiently used.

In a cluster system including, for example, two computers, one computer is an active system and the other one computer is a standby system. At occurrence of a failure in the active computer, when it is necessary that the standby computer achieves entire processing capability of the active computer failed, the standby computer must have processing capability at least equal to that of the failed computer. Moreover, at the failure in the active computer, the standby computer must stop processing being executed on the standby computer and then takes over processing from the failed computer to execute the processing. To execute the processing taken from the failed computer without stopping the own processing being executed by the standby computer, the standby computer must have processing capability higher than that of the failed computer.

Consequently, the cluster system of the background art is attended with a problem in which to achieve processing capability of one computer of the ordinary active system, there are required two computers each of which has processing capability equal to or more than that of the computer of the active system.

SUMMARY OF THE INVENTION

It is therefore an object of the present invention, which has been devised to remove the problems, to provide a computer system and a method for controlling a computer system wherein a cluster system is configured to improve computer reliability and the system can be effectively operated by more efficiently using computer resources.

In accordance with the present invention, the object can be achieved by a method in which a plurality of operating systems are operated in one computer system and computer resources are updated and reallocated to efficiently use the computer resources according to states of operating systems in the computer system. For example, a cluster system is configured in one computer system including an operating system of an active system and another operating system of a standby system. A larger part of the computer resources are allocated to the active operative system. When a failure occurs in the active operating system, the standby operating system takes over processing of the failed operating system. The larger part of computer resources are allocated to the standby operating system, which then starts operation as a new active operating system. This leads to more efficient use of the computer resources.

The object can be achieved by an operation in which the system monitors not only failures of operating systems, but also various states using an environment of update and reallocation of the computer resources to efficiently use the computer resources according to the states thus monitored. For example, when the number of processing assigned to an operating system increases, load on the operating system becomes higher. In this situation, a larger number of computer resources are assigned to the operating system to increase processing capability of the operating system. This relatively decreases the load imposed on the operating system. When load is increased in all operating systems, standby computer resources such as standby central processing units (CPU) and standby memories are added to the system to increase system processing capability. After the processing is terminated, the computer resources added are released. Therefore, the computer resources can be efficiently used.

The object can be achieved by a method in which when a plurality of users accessing a computer system by reallocating computer resources desire a larger part of computer resources in a particular state, each user registers his or her request to a management section of the computer system. After the desired computer resources are used, the user is charged according to a ratio of the used computer resources. The computer system can be therefore developed as a server for a plurality of users. It is possible to provide the computer system with flexible usability including an account system or a charging system.

The object can be achieved by a system including a multiple operating system management controller which operates a plurality of operating systems in one computer system. The multiple operating system management controller manages all operating systems and provides a shared memory for the operating systems. Using the shared memory, the operating systems can communicate under supervision of the multiple operating system management controller with each other via the shared memory without using any external input/output device. Using the communicating function, the controller generates a communication protocol equivalent to a protocol used by a network to thereby support communication with the shared memory. That is, the system can implement a virtual external input/output device on the main memory without using any particular protocol.

BRIEF DESCRIPTION OF THE DRAWINGS

The present invention will be more apparent from the following detailed description, when taken in conjunction with the accompanying drawings, in which:

FIG. 3 is a diagram showing tables to control a computer state;

FIG. 5 is a diagram showing tables necessary for a second embodiment of the present invention;

FIG. 6 is a diagram for explaining a computer resource update table to update computer resource ratios according to load on operating systems;

FIG. 7 is a diagram for explaining a computer resource update state table containing load on computer resources;

FIG. 9 is a diagram for explaining a layout of a computer resource update table for a batch processing system;

FIG. 11 is a diagram for explaining constitution of a user configuration area including a user account table and a user register table necessary for a third embodiment of the present invention;

FIG. 12 is a diagram for explaining a layout of a computer resource account standard area including account standard tables necessary for accounting calculation;

DESCRIPTION OF THE EMBODIMENTS

Referring now to the accompanying drawings, description will be given in detail of an embodiment of a computer system and an embodiment of a method of controlling a computer system in accordance with the present invention.

Figure 1:
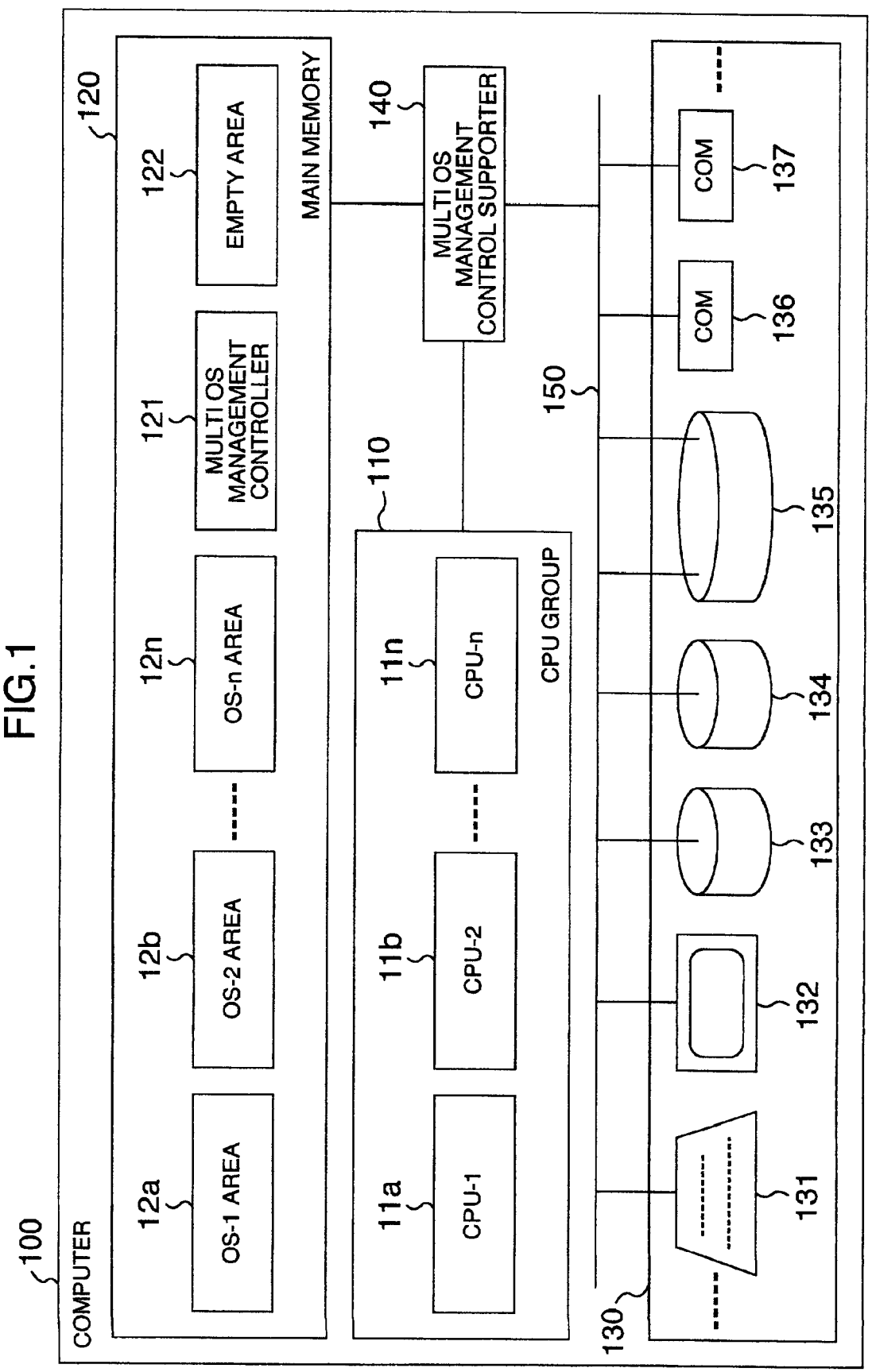
FIG. 1 is a block diagram showing constitution of a first embodiment of a computer system of the present invention.
Figure 2:
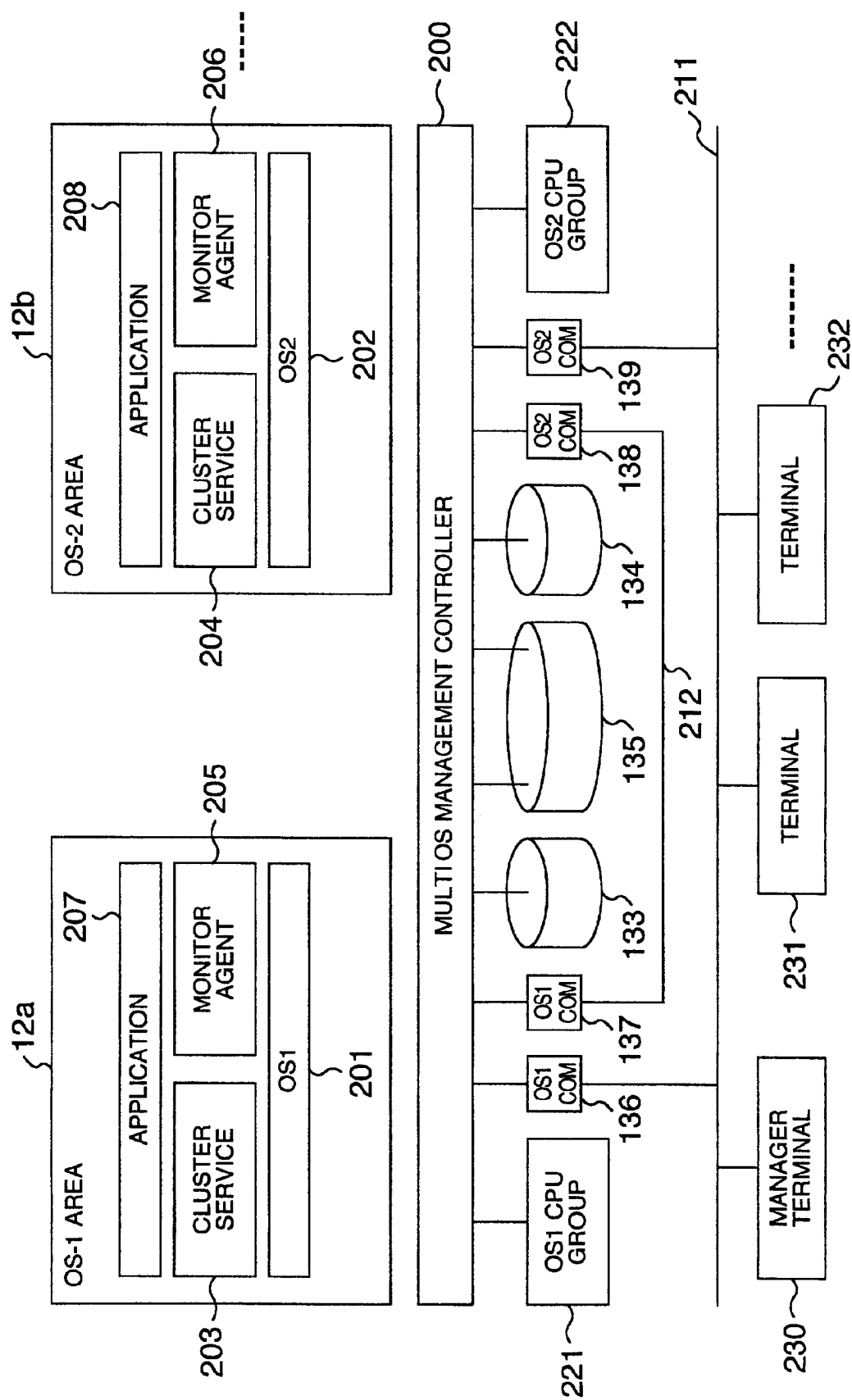
FIG. 2 is a block diagram schematically showing a system construction including a cluster configuration of operating systems running in a computer system.
Figure 4:
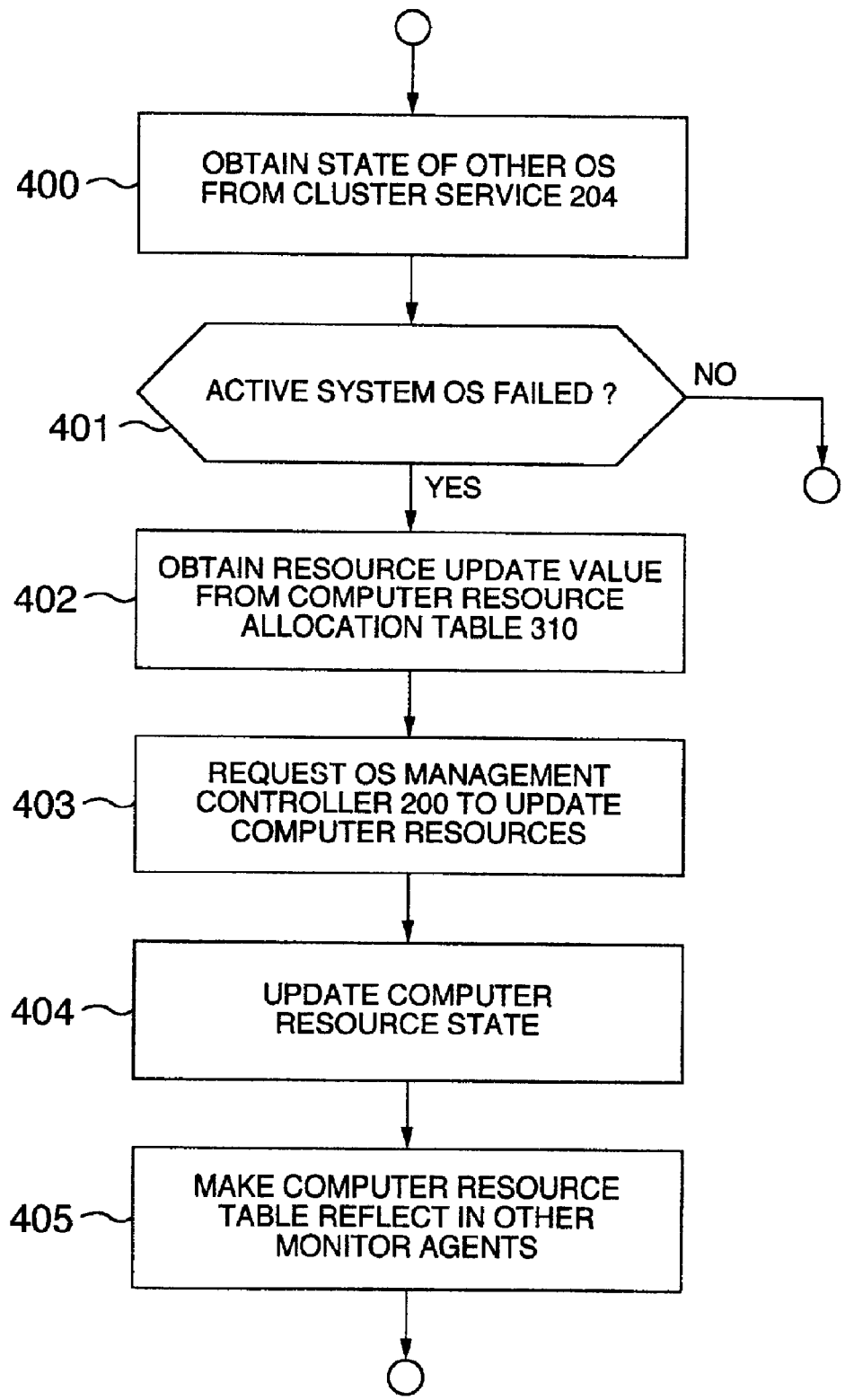
FIG. 4 is a flowchart showing operation to update computer resources at a failure in an operating system.

FIG. 1 shows structure of a first embodiment of a computer system in a block diagram. FIG. 2 shows in a block diagram a schematic configuration of a computer system including operating systems in a cluster layout. FIG. 3 shows tables to control states of a computer. FIG. 4 shows, in a flowchart, operation to update computer resources at a failure of an operating system. In FIG. 1, a computer system 100 includes a processor group 110, a main memory 120, an external input/output device group 130, a multiple operating system (multi OS) management control supporter 140, and a bus 150 establishing connections between the constituent components. In FIG. 2, a multiple operating system management control supporter 200 controls first and second operating systems 201 and 202, cluster services 203 and 204, monitor agents 205 and 206, applications 207 and 208, first and second operating system CPU groups 221 and 222, and terminals 230 to 232.

The computer system 100 of the first embodiment includes a processor group 110, a main memory 120, an external input/output device group 130, a multiple operating system management control supporter 140 to operate a plurality of operating systems in one computer system, and a bus 150 connecting the constituent components to each other as shown in FIG. 1. To enable one computer system to execute a plurality of operating systems, the supporter 140 intervenes between the processor group 110, the main memory 120, and the external device group 130 of the computer system 100. The processor group 110 is a set of one or more processors (CPUs) and includes processors 11a, 11b, . . . , 11n. The main memory 120 includes main memory areas 12a to 12n independent of each other. The areas 12a to 12n are allocated respectively to operating systems, i.e., operating system 1 (OS-1) to operating system n (OS-n). The main memory 120 further includes a main storage area 121 for the multiple operating system management controller and an empty area 122 to be reserved. The external device group 130 includes an input keyboard 131, an output display 132, external storages 133 to 135 for respective operating systems, and communicating devices 136 and 137, and other devices, not shown.

In the example of FIG. 2 schematically showing operating systems running in a computer system configured as shown in FIG. 1, the first and second operating systems OS-1 and OS-2 are arranged in a cluster layout. The external storage 133 is allocated to OS-1, the external device 134 is allocated to OS-2, the disk device 135 is shared between OS-1 and OS-2, the communication devices 136 and 137 are allocated to OS-1, and the communication devices 138 and 139 are allocated to OS-2. The configuration further includes a cable 211 to connect the communication device 136 of OS-1 to the communication device 139 of OS-2 and a cable 212 to connect the communication device 137 of OS-1 to the communication device 138 of OS-2. The cable 211 is a cable to establish external connection to other computers. The cable 212 is a cable for cluster connection only between clusters, namely, between OS-1 and OS-2. FIG. 2 shows two kinds of cables. This is only to improve reliability of the cluster, and the cluster layout can be constructed without using the cable 212. The CPU group 221 is allocated to OS-1 and the CPU group 222 is allocated to OS-2.

The multiple operating system management controller 200 is allocated to the multiple operating system management controller area 121 of the main memory 120 in FIG. 1. The controller 200 updates computer resources, namely, the processor group 110, the main memory 120, and the external input/output device group 130. Any terminals 230 to 232 to be connected to clusters are connected to the cable 211. One of the terminals, for example, the terminal 230 may serve a function as a manager terminal which controls states of OS-1 and OS-2 and notifies, according to the states, update information of computer resources via the cable 211 and each operating system.

The first and second operating systems 201 and 202 are respectively allocated to the OS-1 area 12a and the OS-2 area 12b of the main memory 120. The cluster services 203 and 204, the monitor agents 205 and 206, and applications 207 and 208 for the respective operating systems are respectively stored in the areas 12a and 12b. Each of the monitor agents 205 and 206 is a program which analyzes computer system states and which requests update and/or allocation of computer resources to the multiple operating system management controller according to the computer system states to thereby efficiently use the computer resources.

The CPU groups 221 and 222 for the first and second operating systems are allocated in either one of two methods. First, CPU-1 and CPU-2 of the CPU group 110 are allocated to the first operating system and are collectively called a CPU group 221. CPU-3 and CPU-4 of the CPU group 110 are allocated to the second operating system and are collectively called a CPU group 222. Each CPU is operated only by the associated operating system. Second, CPU1 and CPU2 are allocated to both CPU groups 220 and 221. Each CPU is allocated to another operating system at a predetermined interval of time. Either method may be used to allocate the CPU groups to the operating systems according to the present invention. In accordance with the present invention, the computer resources such as the CPU and the memory are updated to be allocated to a plurality of operating systems of the cluster system according to the states of the operating systems. For example, when the cluster system includes two operating systems in which a first operating system operates as an active system and a second operating system operates as a standby system, a larger number of computer resources are allocated to the active operating system. The allocation of computer resources to the operating systems is managed using a computer resource management table or computer state table 300.

The table 300 to manage allocation of computer resources to OS-1 and OS-2 in the cluster system is configured as shown in FIG. 3 and is stored in an area, not shown, of the main memory 120. The multiple operating system management control supporter 140 manages the table 300. This is also the case with all tables which will be described later. The table 300 includes a computer resource allocation table 310 and an operating system state table 320. In the supporter 140 managing the table 300, a processing executing section is disposed for each resource. The processing executing section recognizes the computer states and the computer resource state according to values in the table 300 and updates allocation of the computer resource. The computer resource allocation table 310 includes entries of which each includes a computer resource name field 311, a computer resource service ratio field 312 for the active computer, and a computer resource service ratio field 313 for the standby computer. This provides a relationship between the computer resource and a role of the computer in the cluster system. Each entry of the operating system state table 320 includes an operating system name field 321, a state information field 322 of each operating system, an information field 323 to indicate that the operating system is an active or standby system, and a service ratio field 324 indicating a service ratio of resource (CPU) for the operating system. The table 320 provides the state of operation of each operating system.

The computer resource management table or the computer state table 300 having a structure as shown in FIG. 3 is updated by the processing executing sections which manage the tables 310 and 320 according to the cluster configuration and the allocation of roles of the processing executing sections of the respective resources. In the table 300 shown in FIG. 3, 95% of the CPU resources are allocated to the active OS-1 and 5% thereof are allocated to the standby OS-2. Although FIG. 3 does not show allocation of areas of the main memory, a larger quantity of the main memory is allocated to the active OS-1. The main memory allocation may be conducted according to a range of addresses, not by the service ratio. Although the resource name fields of the computer resource allocation table 310 are "CPU" and "main memory", the number of external storages reserved for use may also be registered to the table 310.

Referring next to the flowchart of FIG. 4, description will be given of operation to update computer resources at a failure of an operating system. In this example, the monitor agents 205 and 206 monitor the computer resource table 300 shown in FIG. 3. At a failure of OS-1 in the active system, the cluster services 203 and 204, the operating system management controller 200, and the monitor agents 205 and 206 cooperatively update computer resources.

(1) The monitor agents 205 and 206 periodically communicate respectively with the cluster services 203 and 204 and with the multiple operating system management controller 200. Each of the monitor agents 205 and 206 acquires from either one of the communicating partners information whether or not a failure has occurred in an operating system other than the operating system under which the pertinent monitor agent is running (step 400).

(2) The monitor agent 205 or 206 determines whether or not a failure has occurred in an operating system other than the operating system under which the pertinent monitor agent is running. If no failure is detected, processing is terminated (step 401).

(3) If a failure is detected in OS-1 as an active operating system, the monitor agent 206 running under the standby operating system detects occurrence of a failure in OS-1 in the active system. The monitor agent 206 of the standby OS-2 then accesses the computer resource allocation table 310 to acquire therefrom information indicating how to update computer resources in the pertinent situation (step 402).

(4) In this example, the monitor agent 206 under control of the standby operating system detects a failure in the active operating system. Therefore, at a failure in the active operating system, the standby operating system takes over processing of the active system and then starts its operation as an active operating system. Consequently, the CPU allocation ratio of the standby operating system up to this point is changed to the CPU allocation ratio of the current operating system. The monitor agent 206 notifies the update of computer resources to the multiple operating system management controller 200 which actually manages operation of the CPU (step 403).

(5) After the controller 200 conducts the pertinent processing, the operating system state table 320 is updated. The operation state, the type of system, and the CPU use ratio are updated. After the occurrence of the failure, the active operating system becomes a new standby operating system, the standby operating system becomes a new active operating system, and the CPU use ratio is also accordingly changed to a value in the table 320. The main memory use ratio is also updated (step 404).

(6) As preparation for a case in which the new standby operating system is restarted or returned, current information, namely, information that the restarted operating system operates as a standby system is notified to the monitor agent which will again operate under control of the restarted operating system. The processing is thereby terminated (step 405).

In the example of FIG. 4, the monitor agents monitor the computer state table 300. However, the table 300 may be managed by the manager terminal 230, not by the monitor agents. In this case, the manager terminal 230 can manage the states of the operating systems in a centralized manner, and hence the processing of step 405 becomes unnecessary. By connecting the client services of the respective cluster services 203 and 204 to the manager terminal 230, the states of the respective clusters can be obtained. In the operation, the manager terminal 230 need periodically issue, in the processing of step 400, an inquiry to the cluster services 203 and 204 for the operation states of the respective operating systems. In this example, the standby operating system is basically the same as the active operating system. However, the operating systems may differ from each other. It is only necessary that each operating system can execute processing of the same applications.

In the first embodiment of the present invention, a larger part of the CPU resources are allocated to the active operating system with a larger use ratio. At occurrence of a failure in the active operating system, the larger part of the CPU resources can be allocated to the standby operating system which receives processing of the failed operating system and which starts operation as a new active operating system. The computer resources can be therefore more efficiently used.

In the first embodiment of the present invention, the allocation ratio of computer resources to each operating system is determined according to the operation mode of the operating system, namely, the active or standby operating system. When the operation mode is changed, the computer resource allocation ratio is changed. However, in accordance with the present invention, the computer resource allocation ratio may be changed according to amount of processing load on each operating system or according to a particular time to efficiently use the computer resources. Next, a second embodiment of the present invention will be described.

Figure 8:
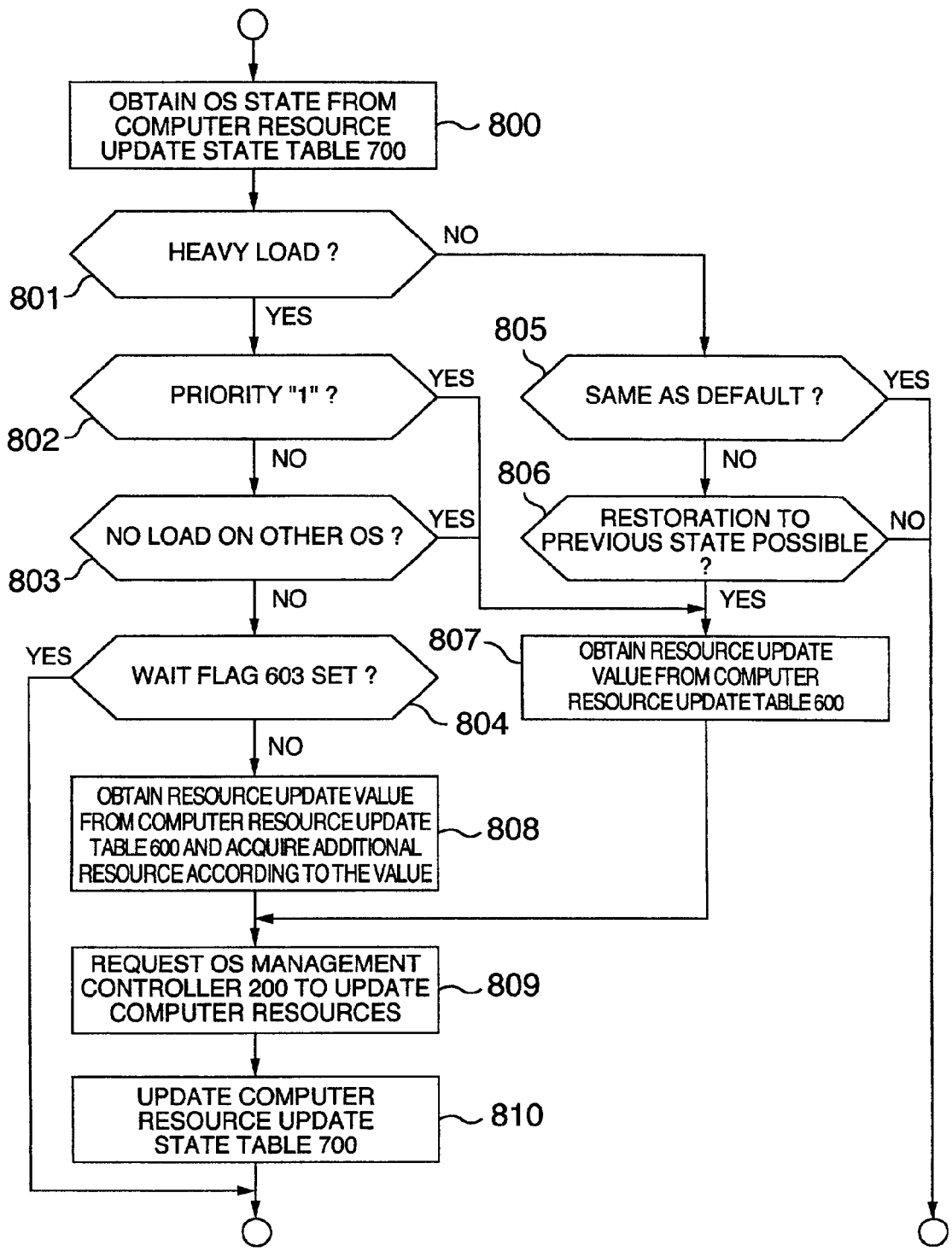
FIG. 8 is a flowchart showing an operation procedure for each operating system to update computer resources.

FIG. 5 shows constitution of tables necessary for the second embodiment. FIG. 6 shows a computer resource update table containing computer resource update information when a high load is imposed onto an operating system. FIG. 7 shows constitution of a computer resource update table including load of computer resources. FIG. 8 shows in a flowchart a processing procedure for each operating system to update computer resources.

The tables of FIG. 5 necessary for the second embodiment represent overall resources of the computer system and resource allocation to each operating system. The tables are stored in a computer resource configuration area 500. That is, the area 500 includes a CPU use table 510, a main memory use table 520, an external device use table 530, a physical CPU configuration table 540, and an operating system configuration table 550.

The CPU use table 510 includes an item field 511. The number of CPUs in use and the number of CPUs not in use are registered to the fields 511. The table 510 further includes an entry field 512 of a value indicating the number of CPUs. The data items are used to change resources. The main memory use table 520 includes an item field 521. The memory capacity in use and the memory capacity not in use are registered to the fields 521. The table 520 further includes a value field 522. The values are registered to the fields 522 corresponding to the fields 521. The external device use table 530 includes an item field 531. External input/output devices are registered to the fields 531. The table 530 includes an information field 532. Whether or not the external input/output device is in use is registered to each associated field 532. The physical CPU configuration table 540 indicates states of CPUs independently used in the CPU group 110. The physical CPU configuration table 540 includes an item field 541. Identifiers of operation systems to subdivide the CPU group 110 are registered to the fields 541. For each operating system identifier, priority among the operating systems is registered to a priority field 542. An initial number of CPUs resultant from initial subdivision of the CPU group 110 is registered to an initial no. field 543. A current number of CPUs actually updated by a monitor agent periodically updating the table 540 is registered to a current number field 544. The priority field 542 contains a priority level which is used to change the resources when the operating system further requests CPUs. The operating system configuration table 550 is a table to which initial states of the respective operating systems are registered. The table includes a name field 551. For each operating system name 551, an execution priority level 552 between the operating systems, a type of operating system 553, an identifier 554 of a physical CPU configuration table, a CPU service ratio 555, a main memory use capacity 556, and external devices in use 556 and 557 are registered to the table 550.

In the tables 550 of FIG. 5, the number of the external devices in use is updated according to connections of the computer system 100. The type of operating system 553 is a transaction type to continuously execute processing and a batch type to execute accumulated processing at a time. In the second embodiment of the present invention, the computer resources are updated in consideration of the difference in the characteristic between the processing systems. This leads to more efficient allocation of the computer resources.

To the computer resource update table 600 of FIG. 6 containing information to update computer resources when load is imposed on an operating system, an operating system name 601, an update rule identifier 602 for each operating system, and other information items are registered as below. A wait flag 603 is a flag which indicates, when there exists a state in which computer resources cannot be actually updated for the condition of the identifier 602 indicating a rule, whether or not the update of computer resource is again retried. The wait flag 603 contains a numeric value. Each time an agent which periodically conducts the monitoring operation executes processing of the flowchart shown in FIG. 8, the agent checks the wait flag 603 to determine whether or not computer resource can be updated. The value of the flag 603 indicates the number of checks made by the agent. For the operating system name 601, the monitor agents 205 and 206 check the operating system load according to a computer resource update condition 604. The condition 604 includes the respective threshold data according to CPU 606, a main memory 607, and the external input/output device 608 for each computer resource. If the registered conditions are satisfied as a result of the check, the monitor agent 205 and 206 issues a request for configuration according to the values of the CPU 609, the main memory 610, and the external input/output device 611 of a computer resource update configuration 605. If there exists any setting shared between the operating system, each operating system selects a rule shared therebetween.

The computer resource update state table 700 shown in FIG. 7 contains an operating system name 701 and states of each operating system name 701. The states include load of each computer resource allocated to each operating system. The monitor agent determines, according to the value of load, whether or not computer resources are to be updated. The monitor agent also manages the states of computer resources after the update. The states are managed together with default values to restore the values. For each operating system name 701, current computer sources including a CPU 702, a main memory 704, an external input/output device 706, and an external input/output device 708 are registered. For the respective items, a CPU load 703, a main memory load 705, an external input/output device load 707, and an external input/output device load 709 are stored in the table 700. The states of computer resources are used as criteria to determine whether or not a computer resource update rule is to be used.

Referring now to the flowchart of FIG. 8, description will be given of a processing procedure for each operating system to update computer resources. The processing is executed by the monitor agent in cooperation with the operating system.

(1) In cooperation with each operation system, the monitor agent periodically checks the operation state of the operating system and stores the operation state in the computer resource update state table 700 representing load of each computer resources. The monitor agent checks whether or not a high load is imposed on the operating system according to information of the computer resource update table 600 (steps 800 and 801).

(2) If the load on the operating system is low as a result of the check in step 801, the monitor agent checks whether or not the resources allocated to the operating system match the default values. If the matching results, the computer resources need not be restored to the original state. Therefore, the monitor agent terminates processing without any special operation (step 805).

(3) If mismatching results from the check to determine whether or not the resources allocated to the operating system match the default values, the monitor agent checks to determine whether or not the state of the computer resources can be restored to the original state. If the restoration is impossible, the monitor agent terminates processing without any special operation (step 806).

(4) If the load on the operating system is high as a result of the check in step 801, the monitor agent checks to determine whether or not the priority level of the operating system is "1" in the operating system configuration table 550. If the priority level is other than "1", the monitor agent acquires a load state of another operating system from the computer resource update table 700 and checks to determine whether or not the load acquired is not high and whether or not the current computer resources can be updated (steps 802 and 803).

(5) If the priority level is "1" as a result of the check in step 802, if the load acquired is not high and the current computer resources can be updated as a result of the check in step 803, or if the state of the computer resources can be restored as a result of the check in step 806, the monitor agent accesses the computer resource update table 600 to acquire therefrom data to change the computer resources (step 807).

(6) If the load acquired is high and the current computer resources cannot be updated as a result of the check in step 803, the monitor agent checks whether or not the wait flag 603 is set for the pertinent operating system and another operating system. If the wait flag is set for either one thereof, the monitor agent updates the wait flag of the pertinent operating system, namely, adds one to the value of the wait flag, and then terminates processing (step 804).

(7) If the wait flag is not set for the operating systems as a result of the check in step 804, the monitor agent accesses the computer resource update table 600 to acquire therefrom data to change the computer resources. The monitor agent then acquires additional computer resources according to the data (step 808).

(8) After step 807 or 808, the monitor agent issues a computer resource update request to the operation system management controller which can actually update the computer resources. After the update of computer resources is finished, the monitor agent updates the computer resource update state table 700 (steps 809 and 810).

According to the second embodiment of the present invention, the load on the operating system is monitored through the processing above. A computer resource update request is issued according to the state of the operating system load to thereby efficiently use computer resources. The computer resources can be therefore efficiently allocated to the operating systems.

In the second embodiment of the present invention, the computer resources to be allocated to the operating systems are changed according to the states of the operating systems. However, in accordance with the present invention, when it is necessary to manage a processing group of each operating system and to preferentially execute the processing of management as compared with the processing of operating systems, a larger part of computer resources can be allocated to an operating system to preferentially execute processing. In accordance with the present invention, computer resources not allocated to any operating systems can be managed and the use ratio of each computer resource allocated to operating systems is monitored. When the use ratio becomes high for an operating system, computer resources not allocated can be allocated to the operating system.

By applying the second embodiment of the present invention to allocation of computer resources to a batch processing system, the batch processing can be executed in a concentrated manner and hence the batch processing can be executed with high efficiency. An example of the batch processing will be described.

Figure 10:
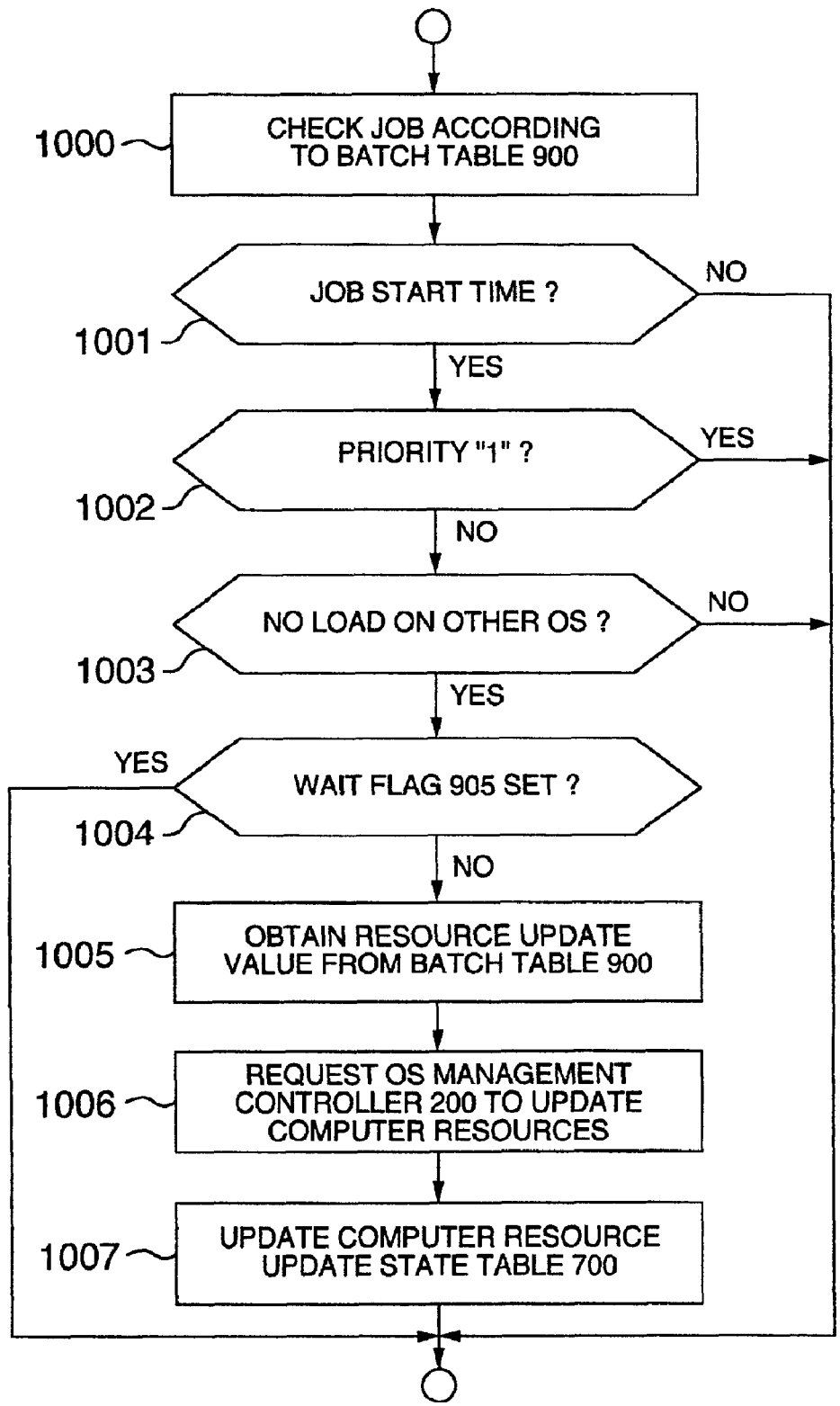
FIG. 10 is a flowchart for explaining operation to update computer resources of a batch processing system.

FIG. 9 shows constitution of a computer resource update table for a batch processing system. FIG. 10 shows in a flowchart a processing procedure to update computer resources for the batch processing system. In this example, each time batch processing is executed, the computer resources of the batch processing system are updated. When other computer resources are available, the resources are allocated to the batch processing system to execute the batch processing in a concentrated manner.

In FIG. 9, a computer resource update table 900 includes an entry field of a job name 901 of batch processing. For each job name 901, the table 900 includes an operating system name 902 for execution of the job, a job start time 903, a job end time 904, and computer resource update conditions 906 of each computer resource between the job start time and the job end time. The conditions 906 are specified in the same fashion as for the computer resource update table 600. Like the table 600, the table 900 includes a wait flag 905.

Referring next to the flowchart shown in FIG. 10, description will be given of a processing process to update computer resources of the batch processing system.

(1) The monitor agent 205 or 206 monitors the job start time in the table 900 to determine whether or not the job start time is at least equal to the current time. If the job start time is not reached, the monitor agent 205 or 206 terminates the processing without conducting any particular operation (steps 1000 and 1001).

(2) If the job start time is reached as a result of the check in step 1001, the monitor agent 205 or 206 checks to determine whether or not the priority level of the operating system of the batch system is "1" as in the processing of FIG. 8. If the priority level is "1", since computer resources have been sufficiently allocated according to the priority level, the monitor agents 205 and 206 terminate the processing without conducting any particular operation (step 1002).

(3) If the priority level is other than "1" as a result of the check in step 1002, the monitor agents 205 and 206 check load of another operating system. If a heavy load is imposed on the operating system, the monitor agent 205 or 206 assumes that allocation of computer resources is impossible and hence terminates the processing without conducting any particular operation (step 1003).

(4) If a heavy load is not imposed on the operating system as a result of the check in step 1003, the monitor agent 205 or 206 checks the wait flag 905 to determine whether or not another operating system is in a wait state after having issued a computer resource update request. If there exists an operating system for which the wait flag has been set, the processing is terminated (step 1004).

(5) If the wait flag has not been set as a result of the check in step 1004, the monitor agent 205 or 206 assumes that computer resources can be updated and acquires an update condition from the computer resource update table 900 and then notifies the condition to the multiple operating system management controller 200 which actually updates the computer resources. After the resource update is finished, the monitor agent 205 or 206 writes the associated state in the computer resource update state table 700 and then terminates the processing (steps 1005 to 1007).

After the processing shown in FIG. 10, the batch processing system executes batch processing by use of the updated computer resources. After the batch processing is completed or when the job end time 904 of the computer resource update table 900 is reached, the monitor agent 205 or 206 restores the state of the computer resources to the state before the update.

As above, the monitor agents manage the states of computers to appropriately update the computer resources. Therefore, the computer resources can be efficiently allocated to a plurality of operating systems.

In general, when a computer of a multiprocessor environment is used as a server machine, a plurality of users access the server machine. In this situation, to guarantee processing performance of the computer accessed, the computer resources are subdivided to be allocated to the respective users. The system to update the computer resources according to the present invention can be assigned to the server machine and an accounting operation or a charging operation can be conducted according to the states of update of the computer resources. By the accounting method, the users can flexibly use the server machine. Description will be next described of a third embodiment of the present invention. In the third embodiment, the computer resource update technique is applied to an accounting method.

Figure 13:
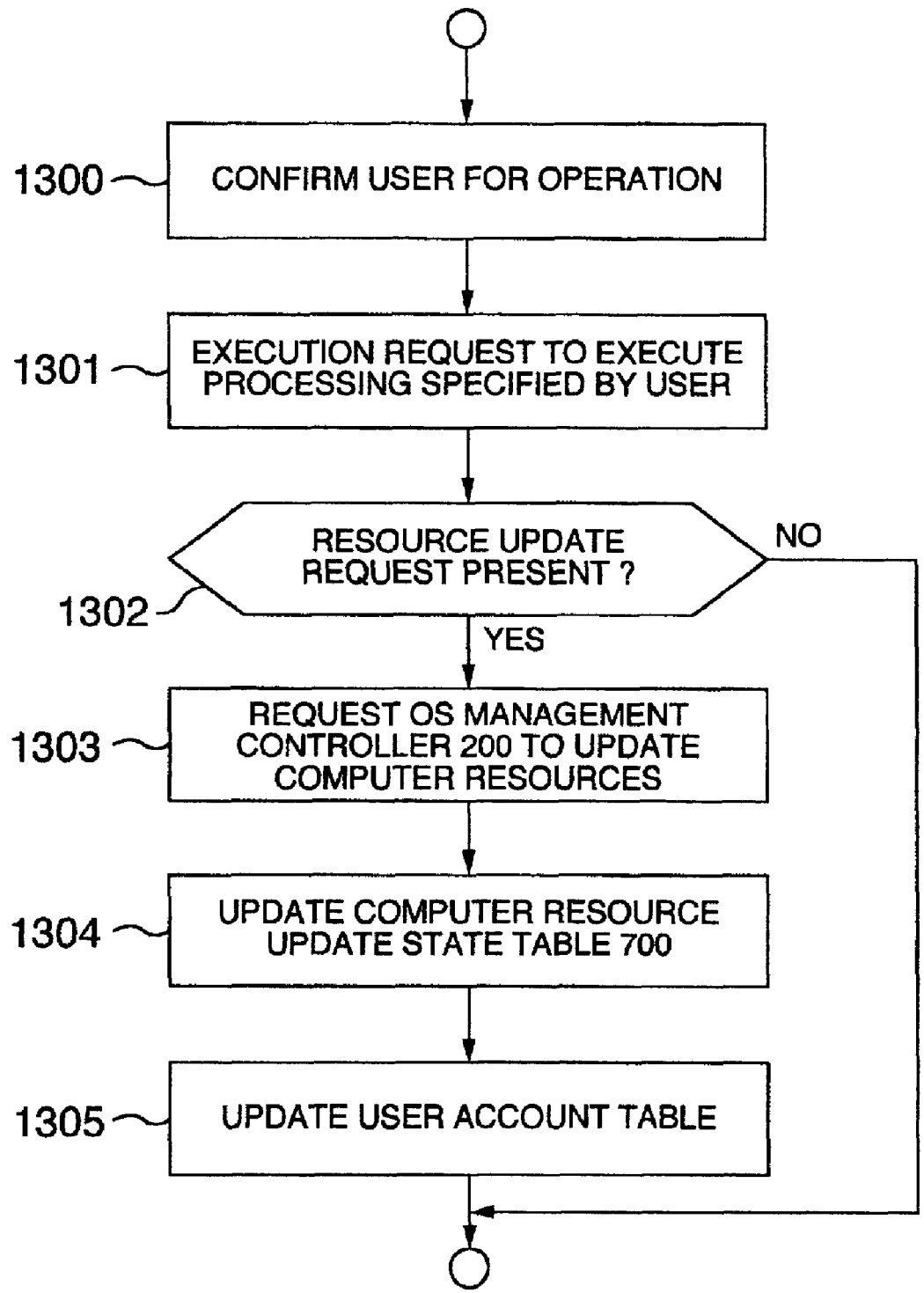
FIG. 13 is a flowchart for explaining an accounting procedure according to use of computer resources.

FIG. 11 shows a configuration of a user configuration area 1100 including a user account table 1110 and a user register table 1120 necessary for the third embodiment. FIG. 12 shows a configuration of a computer resource account standard area 1200 including account standard tables necessary for account calculation. FIG. 13 shows in a flowchart a processing procedure for the accounting operation according to use of computer resources.

The user configuration area 1100 includes the user account table 1110 and the user register table 1120. The table 1110 is updated according to a request from each user to update computer resources. The table 1110 includes a user identifier field 1111. For each user identifier 1111, the table 1110 includes a time charged field 1112, CPU charge state fields 1113 and 1114, main memory charge state fields 1115 and 1116, external input/output device charge state fields 1117 and 1118, and a total charge state field 1119. Appropriate values are set to the respective fields or the contents thereof are appropriately updated. The register table 1120 stores data initially registered by users and includes a user identifier field 1121. For each user ID 1121, the table 1120 includes a start time field 1122, an end time field 1123, a CPU registration field 1124, a main memory registration field 1125, an external input/output device registration field 1126, and a standard account field 1127. The fields up to the field 1126 are initialized to the respective initial values. According to the values initialized, a standard account value is calculated to be set to the standard account field 1127.

In the third embodiment of the present invention, the accounting operation is carried out according to information set to the user account table 1110 and the user register table 1120 shown in FIG. 11. In the tables, a circle indicates that the pertinent item is free of charge excepting the standard charge. For example, when user 1 uses one CPU, the user can conduct operation without any additional charge. When the user uses computer resources exceeding the standard computer resources, the user is charged for the resources used and the charge is added to the standard charge.

The computer resource account standard area 1200 of FIG. 12 includes tables to which account items are set according to respective conditions to conduct the accounting operation. The tables are a CPU account standard table 1210, a main memory account standard table 1230, and an external device account standard table 1250. Standard values for the accounting operation are set to the tables. Each table includes items of account standard values determined for each computer resource according to a use time and a use amount of the pertinent resource.

Referring now to the flowchart of FIG. 13, description will be given of an accounting procedure according to use of computer resources.

(1) The system confirms operation or use of the system by a user. The system acquires a condition from the user, namely, an execution request to execute processing specified by the user. Whether or not a request for computer resource is present is checked. If the request is absent, the computer resources are not updated and control goes to processing of a request from, for example, another user (steps 1300 to 1302).

(2) When a user request for resource update is present as a result of the check in step 1302, a processing request is issued to the multiple operating system management controller 200 according to the condition of the request. After the computer resources are updated, the computer resource update state table 700 is updated, and an associated condition is registered to an associated account table (steps 1303 and 1304).

(3) After the account condition is updated, the state of the computer resources is restored to the original state, a use time and account information are stored in the user account table 1110, and the processing is terminated (step 1305).

According to the third embodiment of the present invention, the user can flexibly update the computer environment. Only when necessary, a high-performance computer system can be supplied. When unnecessary, a computer system having minimum performance is supplied. Therefore, the user can use the computer system at a flexible cost.

Figure 14:
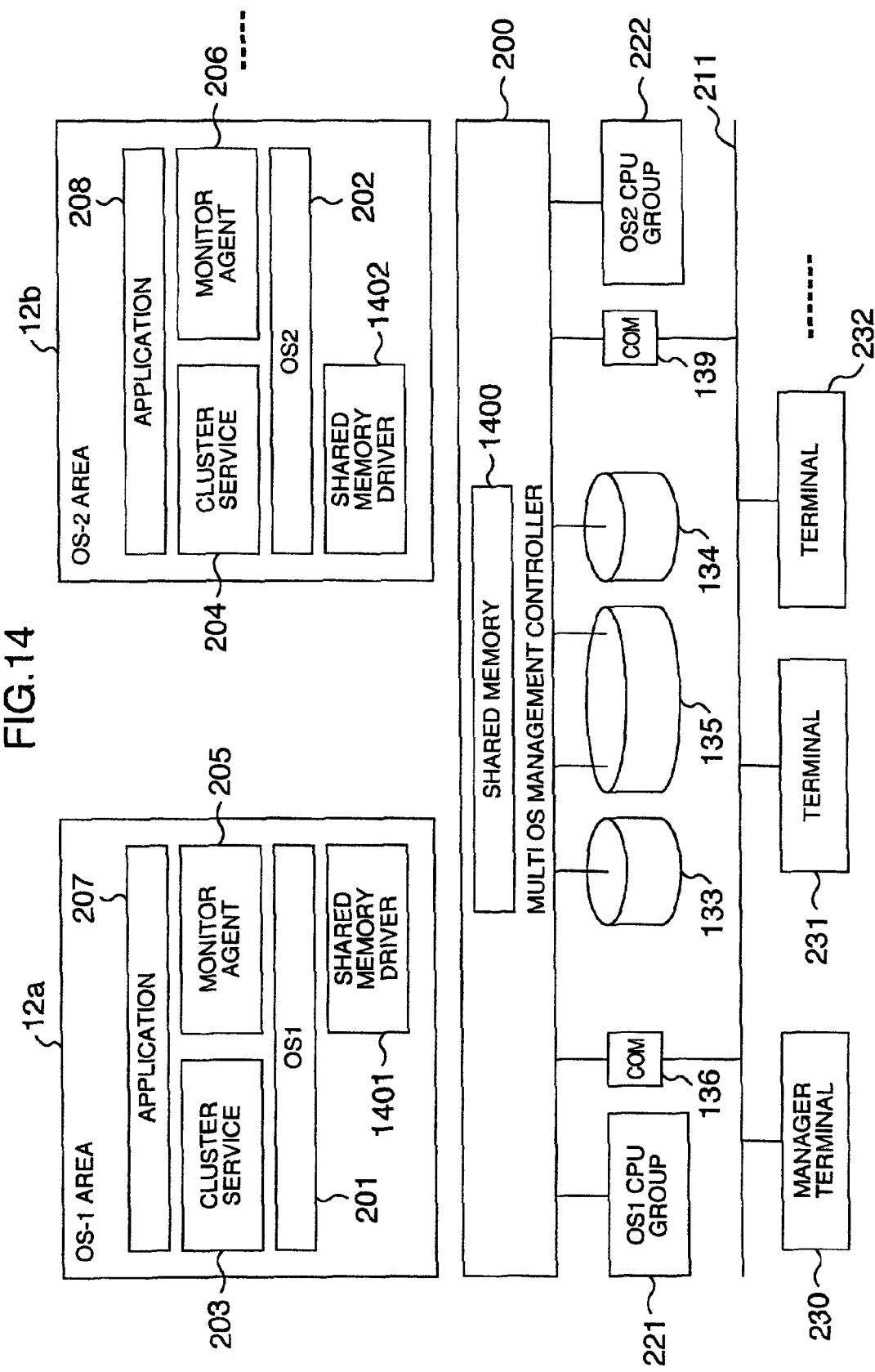
FIG. 14 is a block diagram schematically showing a fourth embodiment of a computer system in which operating systems are configured in a cluster layout.
Figure 15:
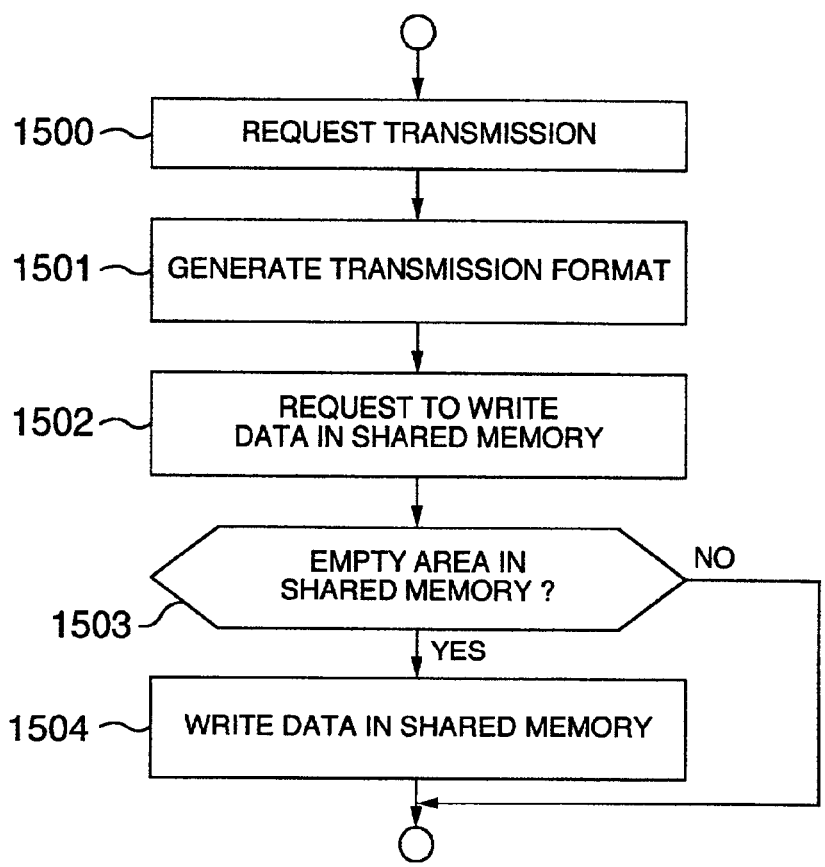
FIG. 15 is a flowchart for explaining a transmission procedure for communication with a shared memory.
Figure 16:
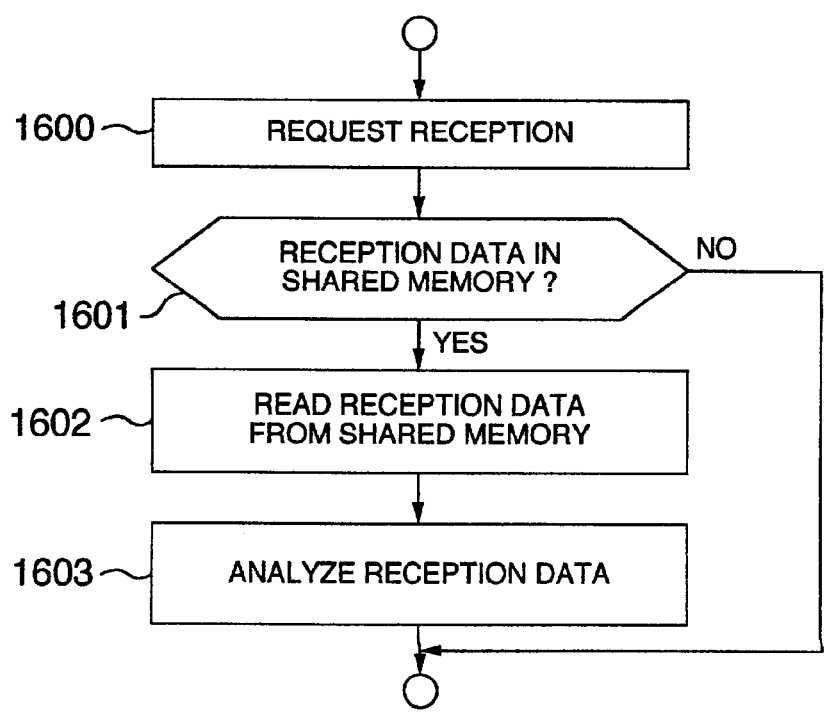
FIG. 16 is a flowchart for explaining a reception procedure for communication with a shared memory.

FIG. 14 shows in a block diagram a schematic configuration of the fourth embodiment of a computer system in which operating systems are arranged in a cluster layout according to the present invention. FIG. 15 shows a transmitting procedure to communicate with a shared memory in a flowchart. FIG. 16 shows a receiving procedure to communicate with a shared memory in a flowchart. The fourth embodiment will be next described.

In the fourth embodiment, the multiple operating system management controller 200 includes a shared memory 1400 shared between the operating systems. In this configuration, data in a format for communication is generated in the shared memory 1400. The system conducts read and write operations to communicate the data in a virtual communication network without using any communication cable. The fourth embodiment of FIG. 14 is implemented by adding the shared memory 1400 to the configuration shown in FIG. 2, specifically, to the multiple operating system management controller 200. The shared memory communication may be used as an internal communication when operating systems are configured in a cluster layout. In the fourth embodiment, the cable 212 of the example of FIG. 2 can be dispensed with, and it is possible to construct an inner communication network. The shared memory communication is accomplished by shared memory communication drivers 1401 and 1402 arranged in the respective operating system areas.

The transmitting procedure of the shared memory communication is carried out according to the flowchart shown in FIG. 15 as below.

(1) The shared memory communication driver 1401 or 1402 converts, on receiving a transmission request from a program under control of an operating system, transmission data associated with the transmission request into a communication format. When it is assumed, for example, that the Ethernet of Transmission Control Protocol/ Internet Protocol (TCP/IP) is used for communication, the transmission data is converted into a format of Ethernet (steps 1500 and 1501).

(2) A write request is issued to the multiple operating system management controller 200 to write the data (step 1502).

(3) The controller 200 checks to determine whether the shared memory 1400 includes an empty area. If no empty area is found, processing is once terminated. The processing is set to a wait state to await an empty area in shared memory 1400 (step 1503).

(4) If an empty area is found as a result of the check in step 1503, the controller 200 writes the transmission data in the area of the shared memory 1400 (step 1504).

Since multiple operating system management controller 200 actually writes the transmission data in the shared memory 1400, the communication driver 1401 or 1402 only transfers the write data to the controller 200.

The receiving procedure of the shared memory communication is accomplished according to the flowchart shown in FIG. 16 as follows. The operating system may issue a reception request to the shared memory communication driver at a fixed interval of time to receive reception data only if the reception data is present. Alternatively, the shared memory communication driver on the transmission side may notify the data transmission to the reception side in a predetermined procedure.

(1) Having received a reception request from a program under control of an operating system, the shared memory communication driver 1401 or 1402 determines presence or absence of reception data associated with the reception request. Specifically, a check is made to determine whether or not reception data has been written in the shared memory 1400. If no reception data is found, processing is terminated (steps 1600 and 1601).

(2) If reception data is found in the shared memory 1400 as a result of the check in step 1601, the reception data is read therefrom and the communication format of the reception data is analyzed, and an inherent part of reception data is thereby obtained (steps 1602 and 1603).

In the example, the communication method using the shared memory makes it possible to implement a virtual communication cable using the shared memory without any actual communication cable. This method is also used for the network communication in the cluster layout. If the memory includes a nonvolatile memory area, the nonvolatile memory area may be assumed as a virtual external storage. By accessing the virtual external storage via Small Computer System Interface (SCSI), a virtual SCSI communication can be achieved.

According to the present invention, in a computer system in which a plurality of operating systems runs on one computer, the operating systems are configured in a cluster layout in an environment in which computer resources can be updated and reallocated for the operating systems. The state of operation of each operating system is monitored. At occurrence of a failure in an active operating system, a larger part of the computer resources are allocated to another operating system which is in a normal state and which becomes a new operating system. Resultantly, regardless of the failure, the computer system can be operated without changing the processing capability thereof.

According to the present invention, the load of operating systems can be monitored to appropriately allocate computer resources to the operating systems according to the load. Therefore, the processing capability can be appropriately adjusted between the operating systems.

The specification and drawings are, accordingly, to be regarded in an illustrative rather than a restrictive sense. It will, however, be evident that various modifications and changes may be made thereto without departing from the broader spirit and scope of the invention as set forth in the claims.

What is claimed is:

1. A computer system running at least one of a plurality of operating systems on one computer, comprising:

at least one disk device;

a communication device to be coupled to an external apparatus which uses at least one of the operating systems;

a memory configured to be divided into a plurality of areas for each operating system;

a plurality of CPUs, each of which is assigned to one of the operating systems; and a controller which is connected to the memory, the communication device, and the CPUs, wherein the controller collects states of resources being used and respectively assigned to at least one of the operating systems running, which resources include the CPUs and the plurality of areas, and allocates the resources for each operating system on the basis of the states collected by the controller.

2. A computer system according to claim 1, wherein said plurality of operating systems include a first operating system and a second operating system configured into a cluster system, the first operating system operating as an active system and the second operating system operating as a standby system, and wherein the controller detects running of another operating system after the second operating system takes over processing of the first operating system, and allocates the resources for both of the first operating system and the second operating system.

3. A computer system according to claim 2,
wherein the controller allocates a larger part of the resources for the second operating system than for the first operating system.

4. A computer system according to claim 1,
wherein the controller allocates the resources for each operating system from the resources which have been assigned to the operating systems running.

5. A computer system according to claim 4,
wherein the controller allocates the resources for each operating system further from resources which are not being used.

6. A computer according to claim 1, further comprising a plurality of agent modules, each of which monitors running of one of the operating systems,
wherein each of the operating systems has a processor group, and
wherein the controller compares the processing between the operating systems to determine processing to be preferentially executed, and allocates a larger part of resources to the operating system to be preferentially executed.

7. A computer system according to claim 1,
wherein the controller analyzes the states of resources collected by the controller, determines a cause of a highest load on one of the operating systems, and allocates to the operating system having the highest load, resources necessary to remove the cause.

8. In a computer system running at least one of a plurality of operating systems on one computer, a method of managing computer resources for the operating systems, comprising the steps of:
collecting states of resources being used and respectively assigned at least one of the operating systems running, which resources include the CPUs and areas of memory of the computer areas; and
allocating the resources for each operating system on the basis of the states of the resources being used.

9. A method according to claim 8,
wherein the plurality of operating systems include a first operating system and a second operating system configured into a cluster system, the first operating system operating as an active system and the second operating system operating as a standby system, further comprising the steps of:
detecting running of another operating system after the second operating system takes over processing of the first operating system; and
allocating a larger part of the resources for the second operating system than for the first operating system.

10. A method according to claim 8,
wherein each of the operating systems has a processor group, and the method further comprises the steps of:
comparing processing between the operating systems to determine processing to be preferentially executed, and
allocating a larger part of resources to the operating system to be preferentially executed.

* * * * *